Sept. 25, 1951 — C. A. GIAUQUE — 2,569,413
STRAINER
Filed Dec. 13, 1947

Inventor:
Charles A. Giauque
By Joseph O. Lange
Atty.

Patented Sept. 25, 1951

2,569,413

UNITED STATES PATENT OFFICE 2,569,413

STRAINER

Charles A. Giauque, Berwyn, Ill., assignor to Crane Co., Chicago, Ill., a corporation of Illinois Application December 13, 1947, Serial No. 791,591

1 Claim. (Cl. 210—169)

This invention relates to strainers for use in straining foreign matter, scale, sediment and the like from pipe lines, and more particularly it is concerned with a novel form of strainer in which the structure employs a plurality of strainer plates, end plates, posts and washers to constitute the assembly.

Heretofore similar strainer constructions have consisted of coiled or helically wound strips with spaced interposed spreaders. But these have been relatively expensive and frequently it has also been difficult to obtain the special stock required for coiling, realizing that the spreaders must also be included in the coiling stock. These prior structures also lacked the desired flexibility in assembly and use.

Accordingly it is one of the more important objects of this invention to provide an economical and easily assembled strainer structure capable of use on a wide variety of services.

Another object is to provide a strainer in which unusual flexibility is obtained by a novel washer arrangement and by the application of such washers at alternate post locations.

Another important object is to provide a strainer in which no special machining on any of the parts is required, and in which easily obtainable washers and rod material may be employed.

Another object is to provide a strainer structure in which by making the strainer plates in uniform increments of diameter they may be produced in various sizes of strainers and thus punched or otherwise formed from the same sheet of material with relatively slight waste or none.

A further object is to provide a strainer which can be easily made to any desired length depending upon the requirements of the installation and which the posts for assembly may be spaced as desired.

A still further object is to provide a strainer construction in which as an alternate substantially conical strainer plates may be used in order to obtain additional strength.

Other objects and advantages will become more readily apparent upon proceeding with the specification read in light of the accompanying drawings in which Fig. 1 is a plan view of the strainer embodying my invention.

Similar reference numerals refer to similar parts throughout the several views.

Figure 1:
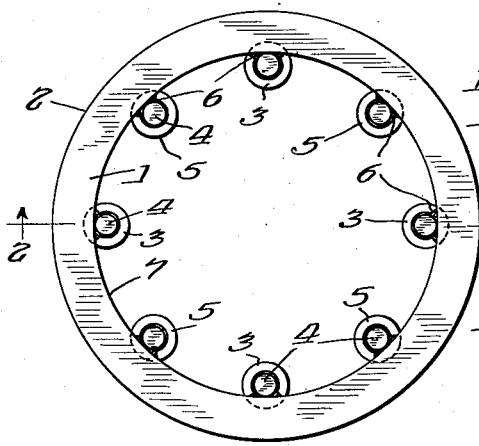
Figure 2:
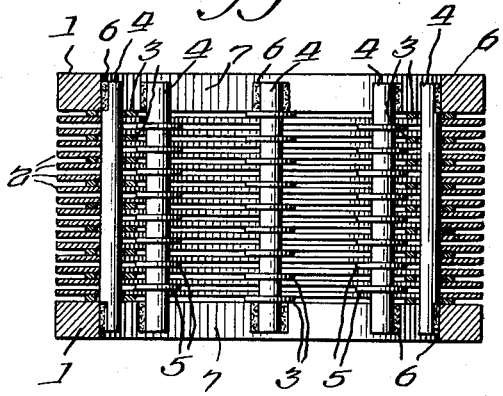
Fig. 2 is a sectional assembly view of the strainer referred to in Fig. 1.

Referring now to Figs. 1 and 2 the strainer as illustrated consists of the end plates 1, the alternately spaced strainer plates 2, with the washers 3 interposed therebetween and held together in assembled relation by means of the posts 4 which as more clearly shown in Fig. 1 may be spaced as desired. Preferably but not necessarily, the washers 5 may be alternately spaced as indicated in Fig. 2 relative to the washers 3. It has been found that the alternate application of washers obviates the solid locking of strainer plates 2 and the circumferential spacing of the posts 4 is an important factor in determining the degree of flexibility of the assembled plates.

Upon completing the assembly above described the posts 4 are welded, preferably a tack-weld, as at 6 to the inner peripheries 7 of the end plates 1. The strainer is then finished and ready to be installed in a suitable casing or body such as that shown on page 423, Crane Co.'s No. 41 Catalog, in which it should be clear that line flow may enter at either the upper or lower portion of the strainer and moving out between the spaces formed by the washers 3 and 5 between the respective plates 2.

In connection with the use of the plates 2, the posts 4 and the washers 3 and 5, it should also be understood that depending on the weight and thickness of these parts and also the kind of material of which they are made, either greater or lesser flexibility may be imparted to the strainer. For example, if the spacer washers 3 and 5 were made of rubber or any similar resilient member and the posts 4 made in suitable dimensions the assembly could be flexed when desired so as to loosen and free any caked material adhering to the plates, washers and posts. The size, proportions and material employed would necessarily vary with nature or character of the installation.

Figure 3:
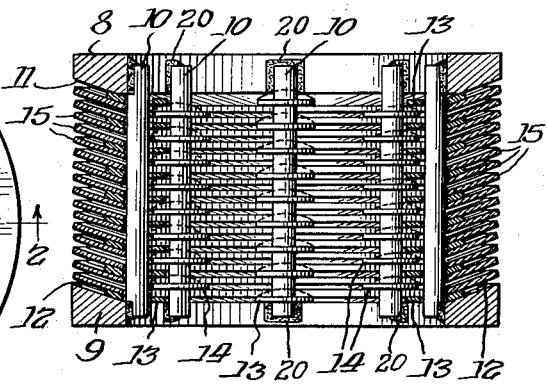
Fig. 3 is a fragmentary sectional view of a modified form of construction.

The principle of my invention permits of various applications. For example in Fig. 3, the use of substantially conical strainer plates will obtain additional strength for the structure. In the latter mentioned figure, the end plates 8 and 9 are made with the respective biased annular portions 11 and 12 between which are alternately fitted the bent washers 13 and 14 to thereby space the strainer plates 15 in a manner similar to that described in connection with Figs. 1 and 2. The number and size of plates, posts and washers will similarly depend upon the requirements of the installation and it may be applied to the same type of casing as that referred to in describing Figs. 1 and 2. The welds 20 complete the assembly of the posts 10 with the end plates 8 and 9.

Figure 4:
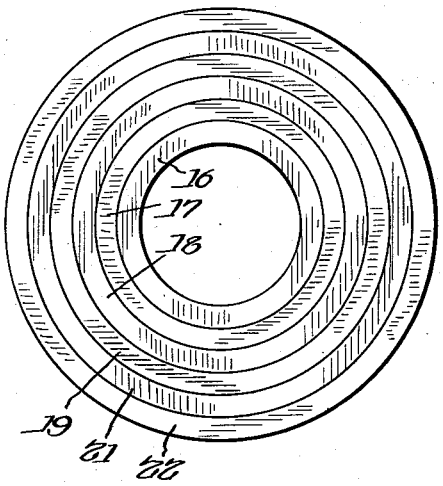
Fig. 4 is a plan view of a plate showing how elements of this invention may be formed therefrom.

A significant characteristic of this invention is displayed in Fig. 4, in which the strainer plates 16, 17, 18, 19, 21 and 22 are made in uniform increments of diameter so that they may be nested as shown. They may be punched out from the same sheet of metal with very little waste. In accomplishing the latter objective it should be understood that in this case, each successively larger or smaller plate 16, etc. is punched from the plate as shown in Fig. 4.

Thus, each plate is employed in a strainer having plates of a similar diameter, i. e., plate 16 is employed in one size strainer, plate 17 in the next larger size, etc.

This construction obviously permits of greater economy in that the stock may be used with a minimum of waste.

It should be obvious that while several embodiments have been shown and described, the invention is capable of taking form in still other exemplifications. It is therefore the desire to be limited only by the scope of the appended claim.

I claim:

In a strainer, the combination including end plates in spaced-apart relation, superposed annular-shaped strainer plates disposed between the said end plates, annularly disposed superposed washer means intermediate said strainer plates and arranged to engage a relatively small inner peripheral portion of said plates whereby to permit limited flexibility of said strainer plates between the said washer means, the outer plate engaging portions of the washer means serving as a fulcrum point for flexing the outer edges of the said plates, annularly-positioned post-like retaining means cooperating with said washer means and end plates connected to the retaining means to secure the strainer plates in said assembled relation thereby to form the walls of the strainer.

CHARLES A. GIAUQUE.

REFERENCES CITED

The following references are of record in the file of this patent:

UNITED STATES PATENTS

| Number | Name | Date |
|---|---|---|
| 942,301 | Wiselogel | Dec. 7, 1909 |
| 990,861 | Hamill | May 2, 1911 |
| 1,078,674 | Hamill | Nov. 18, 1913 |
| 1,111,470 | Krause | Sept. 22, 1914 |
| 1,787,634 | Laubner | Jan. 6, 1931 |
| 1,975,393 | Fulcher | Oct. 2, 1934 |
| 1,976,547 | Dumas | Oct. 9, 1934 |
| 2,053,856 | Weidenbacker | Sept. 8, 1936 |
| 2,063,742 | Holmes | Dec. 8, 1936 |
| 2,365,525 | Cox | Dec. 19, 1944 |

FOREIGN PATENTS

| Number | Country | Date |
|---|---|---|
| 309,543 | Great Britain | Jan. 23, 1930 |
| 334,569 | Great Britain | Sept. 8, 1930 |